United States Patent
Sugiura et al.

(10) Patent No.: US 9,734,574 B2
(45) Date of Patent: Aug. 15, 2017

(54) IMAGE PROCESSOR, TREATMENT SYSTEM, AND IMAGE PROCESSING METHOD

(71) Applicant: KABUSHIKI KAISHA TOSHIBA, Tokyo (JP)

(72) Inventors: Kyoka Sugiura, Kanagawa (JP); Yukinobu Sakata, Kanagawa (JP); Ryusuke Hirai, Tokyo (JP); Yasunori Taguchi, Kanagawa (JP); Takeshi Mita, Kanagawa (JP); Tomoyuki Takeguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/665,059

(22) Filed: Mar. 23, 2015

(65) Prior Publication Data
US 2015/0279111 A1 Oct. 1, 2015

(30) Foreign Application Priority Data
Mar. 26, 2014 (JP) ................................. 2014-064216

(51) Int. Cl.
*G06T 19/00* (2011.01)
*G06T 7/00* (2017.01)
*G06T 1/20* (2006.01)

(52) U.S. Cl.
CPC .............. *G06T 7/0012* (2013.01); *G06T 1/20* (2013.01); *G06T 19/00* (2013.01)

(58) Field of Classification Search
None
See application file for complete search history.

(56) References Cited

U.S. PATENT DOCUMENTS

| 8,989,349 B2 | 3/2015 | Thomson et al. |
| 9,168,007 B2 | 10/2015 | Ozaki et al. |
| 2005/0143724 A1* | 6/2005 | El-Galley ........... A61B 18/1402 606/34 |
| 2006/0050943 A1 | 3/2006 | Ozaki et al. |
| 2006/0074292 A1 | 4/2006 | Thomson et al. |
| 2006/0214930 A1 | 9/2006 | Matsumoto |
| 2012/0327081 A1* | 12/2012 | Suda ....................... A61B 6/12 345/419 |

(Continued)

FOREIGN PATENT DOCUMENTS

| JP | 2004-180932 | 7/2004 |
| JP | 2006-263078 | 10/2006 |

(Continued)

*Primary Examiner* — Said Broome
(74) *Attorney, Agent, or Firm* — Nixon & Vanderhye, P.C.

(57) ABSTRACT

According to some embodiments, an image processor of an embodiment has an imaging parameter acquirer and a virtual perspective image generator. The imaging parameter acquirer acquires an imaging parameter which is used by a radiographic imaging apparatus in capturing a perspective image of a target. The virtual perspective image generator determines a method of generating a virtual perspective image from volume data acquired by capturing the target in accordance with the imaging parameter. The virtual perspective image generator generates the virtual perspective image from the volume data in accordance with the determined method.

20 Claims, 13 Drawing Sheets

(56) References Cited

U.S. PATENT DOCUMENTS

| | | |
|---|---|---|
| 2015/0045605 A1 | 2/2015 | Hirai et al. |
| 2015/0117605 A1 | 4/2015 | Sugiura et al. |
| 2015/0154752 A1 | 6/2015 | Hirai et al. |
| 2015/0154757 A1 | 6/2015 | Sakata et al. |

FOREIGN PATENT DOCUMENTS

| | | |
|---|---|---|
| JP | 2008-514352 | 5/2008 |
| JP | 2015-029838 | 2/2015 |
| JP | 2015-065012 | 5/2015 |
| JP | 2015-104469 | 6/2015 |
| JP | 2015-106262 | 6/2015 |

\* cited by examiner

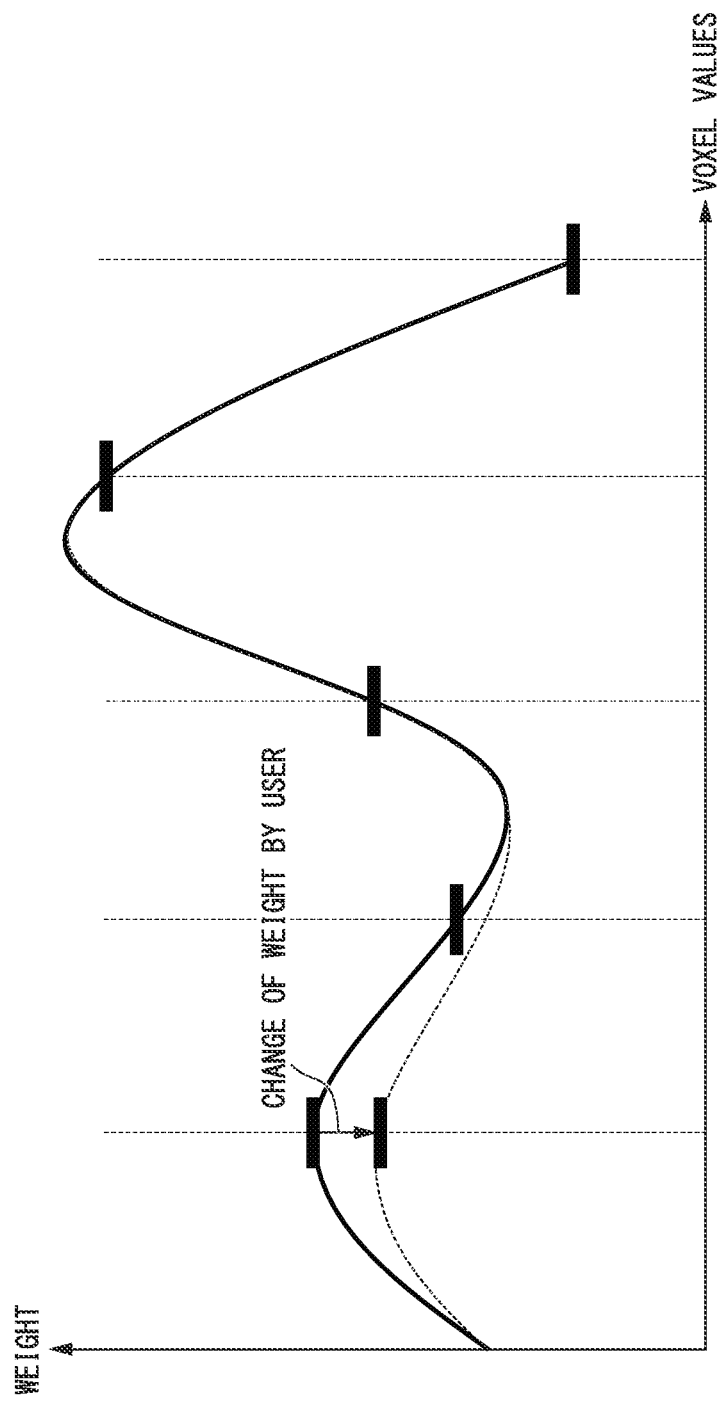

IMAGE PROCESSOR, TREATMENT SYSTEM, AND IMAGE PROCESSING METHOD

CROSS-REFERENCE TO RELATED APPLICATIONS

This application is based upon and claims the benefit of priority from Japanese Patent Application No. 2014-064216, filed Mar. 26, 2014; the entire contents of which are incorporated herein by reference.

FIELD

Embodiments described herein relate generally to an image processor, a treatment system, and an image processing method.

BACKGROUND

When establishing a treatment plan in radiotherapy and the like, a perspective image of a target is generated virtually from three-dimensional volume data of the target (for example, the object to be treated) obtained beforehand. In the following, a perspective image of a virtual target generated from three-dimensional volume data will be called a virtual perspective image. A virtual perspective image is generally generated by adding voxel values of three-dimensional volume data existing on straight lines joining a viewing point with each virtual perspective image pixel.

A virtual perspective image is used for positioning in radiotherapy and the like. A virtual perspective image used for positioning is generated from three-dimensional volume data of the target used when a radiotherapy plan was established, in the same manner as when the treatment plan is established. Positioning is done by comparing the generated virtual perspective image with the perspective image captured at the time of treatment. The appearances of the virtual perspective image and the perspective image are sometimes different. Because the difference in appearance affects the positioning accuracy, the appearance of the virtual perspective image is controlled.

However, the appearance of the perspective image varies in accordance with imaging parameters such as the X-ray tube voltage and tube current in an apparatus (for example, X-ray imaging apparatus) used to obtain the perspective image. For this reason, in some cases, there can be a significant difference in appearance between the virtual perspective image and the perspective image.

BRIEF DESCRIPTION OF THE DRAWINGS

FIG. 15 is a drawing showing a weighting table display example.

DETAILED DESCRIPTION

According to some embodiments, an image processor of an embodiment has an imaging parameter acquirer and a virtual perspective image generator. The imaging parameter acquirer acquires an imaging parameter which is used by a radiographic imaging apparatus in capturing a perspective image of a target. The virtual perspective image generator determines a method of generating a virtual perspective image from volume data acquired by capturing the target in accordance with the imaging parameter. The virtual perspective image generator generates the virtual perspective image from the volume data in accordance with the determined method.

First Embodiment

Figure 1:
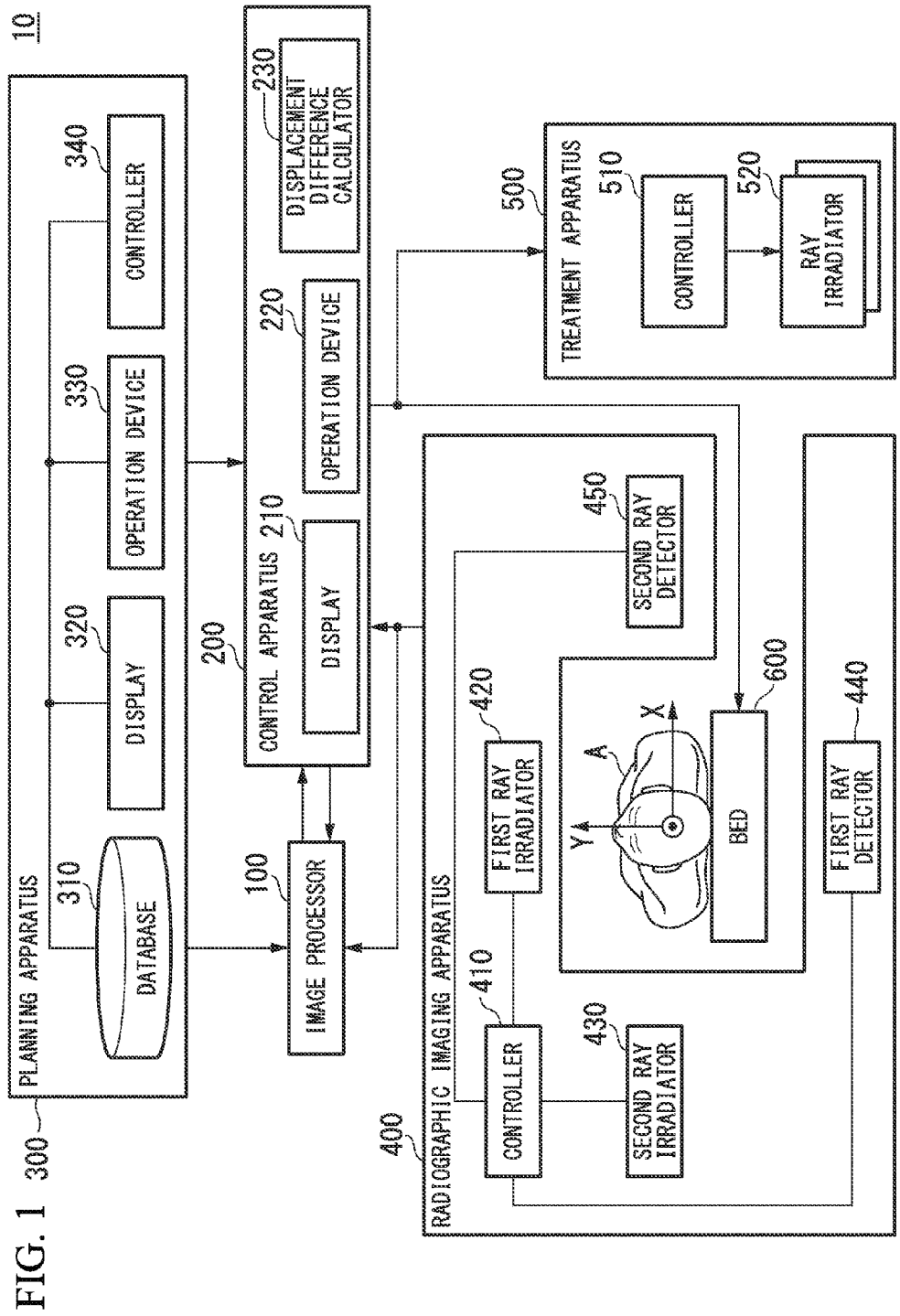
FIG. 1 is a block diagram showing the configuration of a treatment system 10.

FIG. 1 is a block diagram showing the configuration of the treatment system 10 in the first embodiment. The treatment system 10 has the image processor 100, a control apparatus 200, and a radiographic imaging apparatus 400.

The treatment system 10 may further have a planning apparatus 300, a treatment apparatus 500, and a bed 600. In the treatment system 10, based on a treatment plan set in the planning apparatus 300, a user such as a physician or a technician operates the control apparatus 200, the radiographic imaging apparatus 400, the treatment apparatus 500, and the bed 600 to perform treatment. The user, based on a comparison of a virtual perspective image generated by the image processor 100 and a perspective image captured by the radiographic imaging apparatus 400, operates the control apparatus 200.

The planning apparatus 300 establishes a treatment plan with respect to the target A to be subjected to radiotherapy, proton therapy, particle radiotherapy, or the like. The planning apparatus 300 establishes a treatment plan, based on information such as a captured image of the internal form of a target A and operations input by a user such as a physician or technician. The images used in the planning apparatus 300 are images captured by a radiographic imaging apparatus capable of viewing and capturing the inside of the target A. The radiographic imaging apparatus may be, for example, an X-ray imaging apparatus, a computed tomography (CT) apparatus, a magnetic resonance imaging (MRI) apparatus, a positron emission tomography (PET) apparatus, or a single photon emission computed tomography (SPECT) apparatus. The images may be either two-dimensional images or three-dimensional images. In the present embodiment, the description will be for the case of images collected by an X-ray CT apparatus being used in establishing a treatment plan.

The planning apparatus 300 has a database 310, a display 320, an operation device 330, and a controller 340. The database 310 has stored therein data obtained by imaging the target A.

The stored data may be the voxel data itself obtained by imaging the target A, or may be voxel data after being subjected to correction processing, such as logarithmic conversion, offset correction, sensitivity correction, beam hardening correction, or scattered radiation correction with respect to the data obtained by imaging. In addition to voxel data, the database 310 may store a two-dimensional image reconstructed from voxel data. In the present embodiment, the voxel data in the database 310 will be described for the case of being stored as three-dimensional volume data.

The display 320 displays a virtual perspective image, under the control of the controller 340. In the present embodiment, the description will be for an example in which voxel data stored in the database 310 is reconstructed and an image (DRR: digitally reconstructed radiograph) obtained by viewing the target A from a predetermined direction is used as the virtual perspective image. The virtual perspective image displayed by the display 320 preferably corresponds to the type of image captured by the radiographic imaging apparatus 400, which will be described later.

If the radiographic imaging apparatus 400 is an X-ray imaging apparatus, the display 320 preferably displays a DRR image resulting from simulating the image captured by the X-ray imaging apparatus.

The operation device 330 receives input of operations entered by a user and sends to the controller 340 information responsive to the received operation input. The controller 340, based on the information responsive to the operation input received by the operation device 330, controls the operation of the various parts of the planning apparatus 300. The controller 340 is an information processor that includes, for example, a central processing unit (CPU) and that performs processing based on a specific program. The user enters information indicating a region of the target to be treated based on the reconstructed image. The controller 340 stores the information entered by the user into the database 310.

The radiographic imaging apparatus 400 is an X-ray imaging apparatus. The radiographic imaging apparatus 400 views the inside of the target A and captures images of the inside of the target A. The present embodiment will be described for the case of the radiographic imaging apparatus 400 being an X-ray imaging apparatus. The radiographic imaging apparatus 400 has a controller 410, a first ray irradiator 420, a second ray irradiator 430, a first ray detector 440, and a second ray detector 450.

The first ray detector 440 generates a perspective image viewing the target A, based on an X-ray irradiated from the first ray irradiator 420 and passed through the target A. The first ray detector 440 has a flat panel detector (FPD) receiving an X-ray passed through the target A. The first ray detector 440 converts it to a digital signal, and generates a perspective image based on the digital signal.

The second ray detector 450 generates a perspective image viewing through the target A, based on an X-ray irradiated from the second ray irradiator 430 and passed through the target A. The second ray detector 450, similar to the first ray detector 440, has an FPD that receives the X-ray passed through the target A, converts it to a digital signal, and generates a perspective image based on the digital signal.

The viewing direction in which the first ray detector 440 views the target A differs from that in which the second ray detector 450 views the target A. For example, the first ray irradiator 420, the second ray irradiator 430, the first ray detector 440, and the second ray detector 450 are disposed so that the imaging plane of the FPD of the first ray detector 440 and the imaging plane of the FPD of the second ray detector 450 are mutually perpendicular. The first ray detector 440 and the second ray detector 450 may each have an image intensifier (II) in place of the FPD.

The controller 410 controls each part of the radiographic imaging apparatus 400. The controller 410 is, for example, an information processing apparatus having a central processing unit (CPU) or the like, and performs processing based on a specific program. The controller 410 transmits to the control apparatus 200 perspective images of the target A generated by the first ray detector 440 and the second ray detector 450.

The image processor 100 acquires from the radiographic imaging apparatus 400 the imaging parameters at the time the perspective image of the target A was captured. The image processor 100 reads out from the database 310 of the planning apparatus 300 three-dimensional volume data, formed by a set of voxel values, which was used in establishing the treatment plan. The image processor 100, based on the imaging parameters, generates from three-dimensional volume data a virtual perspective image from the same viewing point as when the perspective image of the target A was captured.

The image processor 100 determines the method of generating the virtual perspective image, based on the imaging parameters. By generating the virtual perspective image in accordance with the imaging parameters when the perspective image was captured, the difference between the appearance of the perspective image captured by the radiographic imaging apparatus 400 and the appearance of the virtual perspective image can be reduced. Reducing the difference between the appearances of the perspective image and the virtual perspective image facilitates recognition by the user of the relationship of correspondence between the perspective image and the virtual perspective image. In this case, the difference in appearance is the difference in the visual appearance of the images, for example the difference in contrast, the difference in brightness or luminance, or the difference in tones between the images. The image processor 100 sends the generated virtual perspective image to the control apparatus 200. The configuration of the image processor 100 and the details of the generation of the virtual perspective image will be described later.

The control apparatus 200 acquires a treatment plan established by the planning apparatus 300, the perspective image captured by the radiographic imaging apparatus 400, and the virtual perspective image generated by the image processor 100. The control apparatus 200 displays a location of the target A specified in the treatment plan, the perspective image, and the virtual perspective image, and receives operation inputs from the user. The control apparatus 200, based on the received operation inputs, the perspective image, and the virtual perspective image, calculates the shift of the target A. The shift of the target A is the difference between the position of the target A at the time of the treatment plan and the position of the target A when it is captured by the radiographic imaging apparatus 400.

The control apparatus 200 has a display 210, an operation device 220, and a displacement difference calculator 230. The display 210 acquires image data from the image processor 100 and the radiographic imaging apparatus 400. The image data is, for example, a virtual perspective image generated based on voxel data and a perspective image acquired by the radiographic imaging apparatus 400. The display 210 displays images indicating the acquired image data.

The operation device 220 receives input of operations from the user, and sends information responsive to the operation input to the displacement difference calculator 230 and the image processor 100. The operation device 220 receives operation inputs indicating the position on the image displayed on the display 210, and sends coordinate information indicating the position. For example, the operation device 220 is a keyboard, a pointing device such as a mouse, or a touch panel. If the operation device 220 is, for example, a touch panel, the display 210 and the operation device 220 may be integrated as one.

The displacement difference calculator 230 compares the virtual perspective image and the perspective image. The displacement difference calculator 230, based on information input by the user operating the operation device 220, calculates the shift (displacement) between a location on the target A at the time of the treatment plan and a location on the target A when treatment is done. The displacement difference calculator 230 sends positioning information indicating the calculated shift to the bed 600. Information input to the control apparatus 200 by the user is, for example, information indicating corresponding locations in the virtual perspective image and the perspective image and information for specifying the shift between the virtual perspective image and the perspective image.

The treatment apparatus 500 performs treatment that subjects the target A to radiotherapy, proton therapy, or particle radiotherapy. The treatment apparatus 500 has a controller 510 and a plurality of ray irradiators 520. The controller 510 controls the various parts of the treatment apparatus 500. The controller 510 is, for example, a control processing apparatus having a CPU or the like, and performs processing based on a specific program. After detecting that the target A has been moved by the bed 600, the controller 510, based on the shift calculated by the control apparatus 200, places the ray irradiators 520 in an operable state. Having gone into the operable state, each of the plurality of ray irradiators 520 subjects the target A to irradiation, a proton beam, or a particle beam, based on control by the user. The ray irradiators 520 are disposed so that the radiation, proton beams, or particle beams therefrom intersect at one point (isocenter).

The bed 600 has a movable bed, such as a bed or chair, upon which the target A rests. The bed 600 moves the movable bed on which the target A rests, based on positioning information sent by the control apparatus 200. The bed 600 moves the target A based on the positioning information. The bed 600 moves a predetermined location on the target A, which was determined at the time of establishing the treatment planning, to the isocenter.

Figure 2:
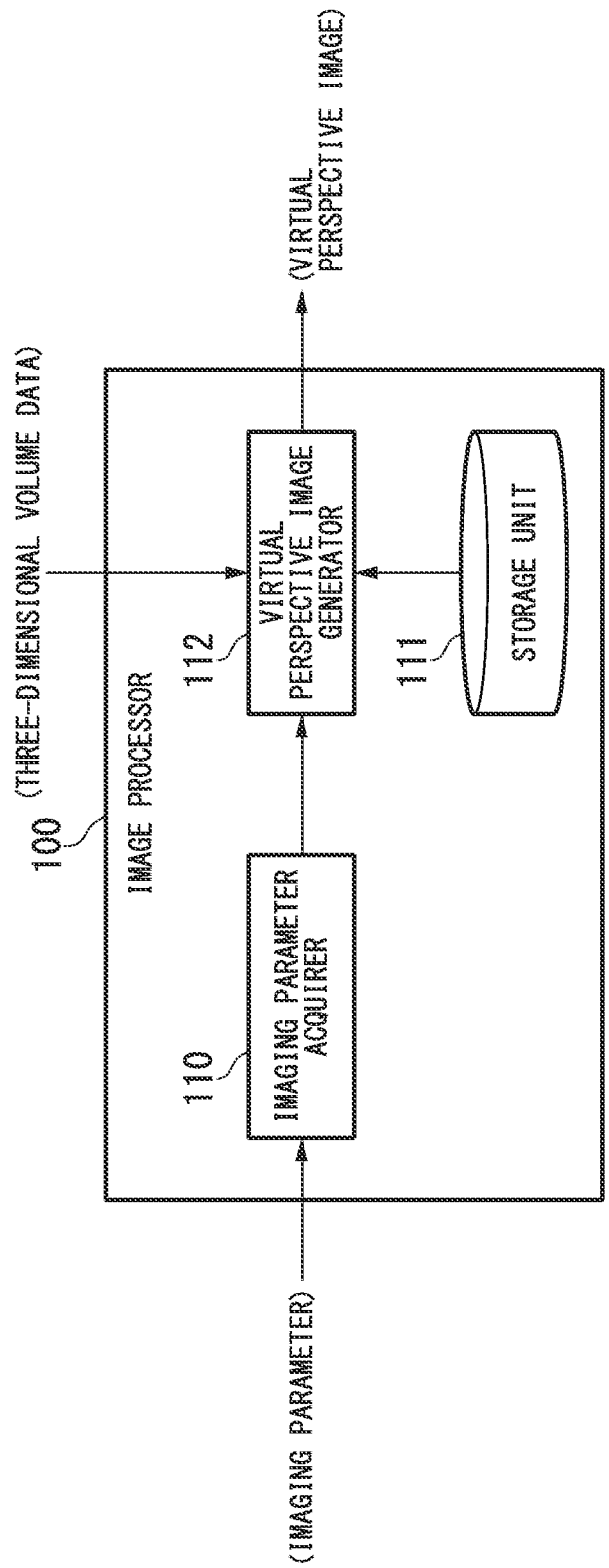
FIG. 2 is a block diagram showing the configuration of an image processor 100.

FIG. 2 is a block diagram showing the configuration of the image processor 100 in the first embodiment.

As shown in FIG. 2, the image processor 100 has an imaging parameter acquirer 110, a storage unit 111, and a virtual perspective image generator 112. The imaging parameter acquirer 110 acquires imaging parameters when the radiographic imaging apparatus 400 captures the perspective image of the target A. The imaging parameters are information such as information indicating the X-ray source tube voltage and tube current, the manufacturer and model of the radiographic imaging apparatus 400 at the time the radiographic imaging apparatus 400 captures a perspective image. In the following, the imaging parameter will be described as the tube voltage.

The storage unit 111 has stored therein beforehand a weighting table used by the virtual perspective image generator 112 generating a virtual perspective image. The weighting table indicates the relationship of correspondence between each voxel value V and a weighting W (weighting coefficient) in three-dimensional volume data. A value, for example, that makes the square error between a pixel value in a virtual perspective image and a pixel value in a plurality of reference perspective images minimum when the reference images and a virtual perspective image generated from the same viewpoint as each reference perspective image are compared is used as the weighting W. The weighting table may be generated from sample data used for pre-learning.

The virtual perspective image generator 112 acquires imaging parameters from the image parameter acquirer 110. The virtual perspective image generator 112 reads the three-dimensional volume data from the database 310 of the planning apparatus 300. The virtual perspective image generator 112 generates a virtual perspective image from the read-out three-dimensional volume data, based on the imaging parameters and the weighting table.

Figure 3:
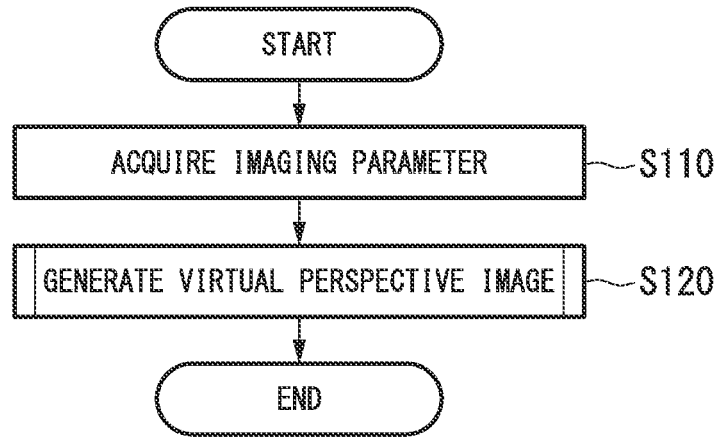
FIG. 3 is a flowchart showing the processing when the image processor 100 generates a virtual perspective image.
Figure 4:
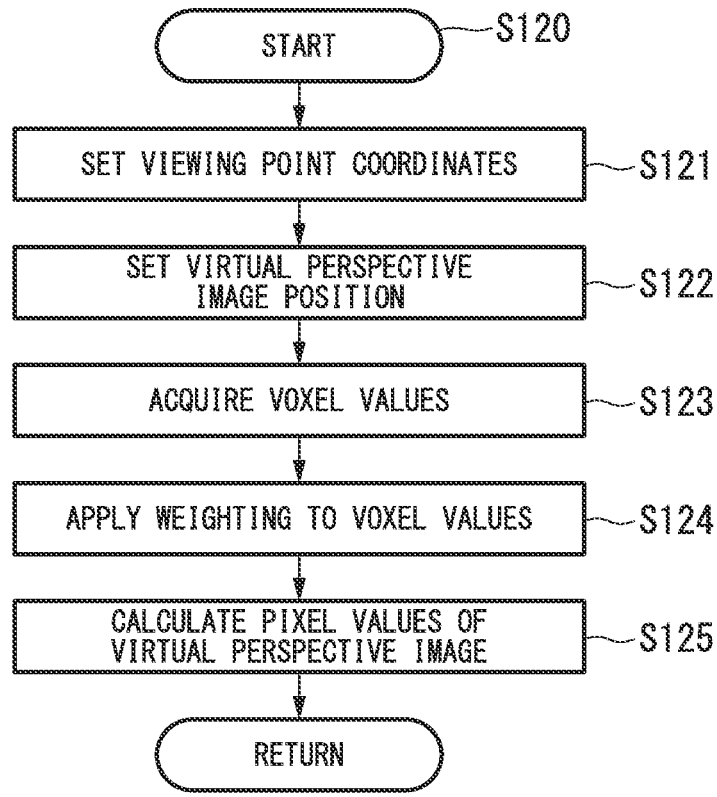
FIG. 4 is a flowchart showing the processing when the image processor 100 generates a virtual perspective image.

FIG. 3 and FIG. 4 are flowcharts showing the processing when the image processor 100 in the first embodiment generates a virtual perspective image. In the image processor 100, when the virtual perspective image generation starts, the imaging parameter acquirer 110 acquires the tube voltage as an imaging parameter when the perspective image (X-ray image) was captured (step S110). The imaging parameter acquirer 110 may acquire the tube voltage from DICOM (Digital Imaging and Communication in Medicine) header information included in the image data of the X-ray image. Alternatively, the imaging parameters acquirer 110 may acquire imaging parameters such as the tube voltage from information input by the user.

The virtual perspective image generator 112 generates a virtual perspective image based on three-dimensional volume data and the tube voltage acquired by the imaging parameter acquirer 110 (step S120). When the generation of the virtual perspective image starts, the virtual perspective image generator 112 sets the viewing point coordinates $(1_X, 1_Y, 1_Z)$ for viewing the target A represented by three-dimensional volume data (step S121). The viewing point coordinates are, for example, predetermined coordinates, based on the position of the first ray irradiator 420 or of the second ray irradiator 430 of the radiographic imaging apparatus 400 and the position of the isocenter of the treatment apparatus 500. The viewing point coordinates are in a three-dimensional coordinate system (X, Y, Z) using an arbitrary position as a reference. In the following, the three-dimensional coordinate system (X, Y, Z) will be used as the reference coordinate system. The reference in the three-dimensional coordinate system may be isocenter of the treatment apparatus 500.

Figure 5:
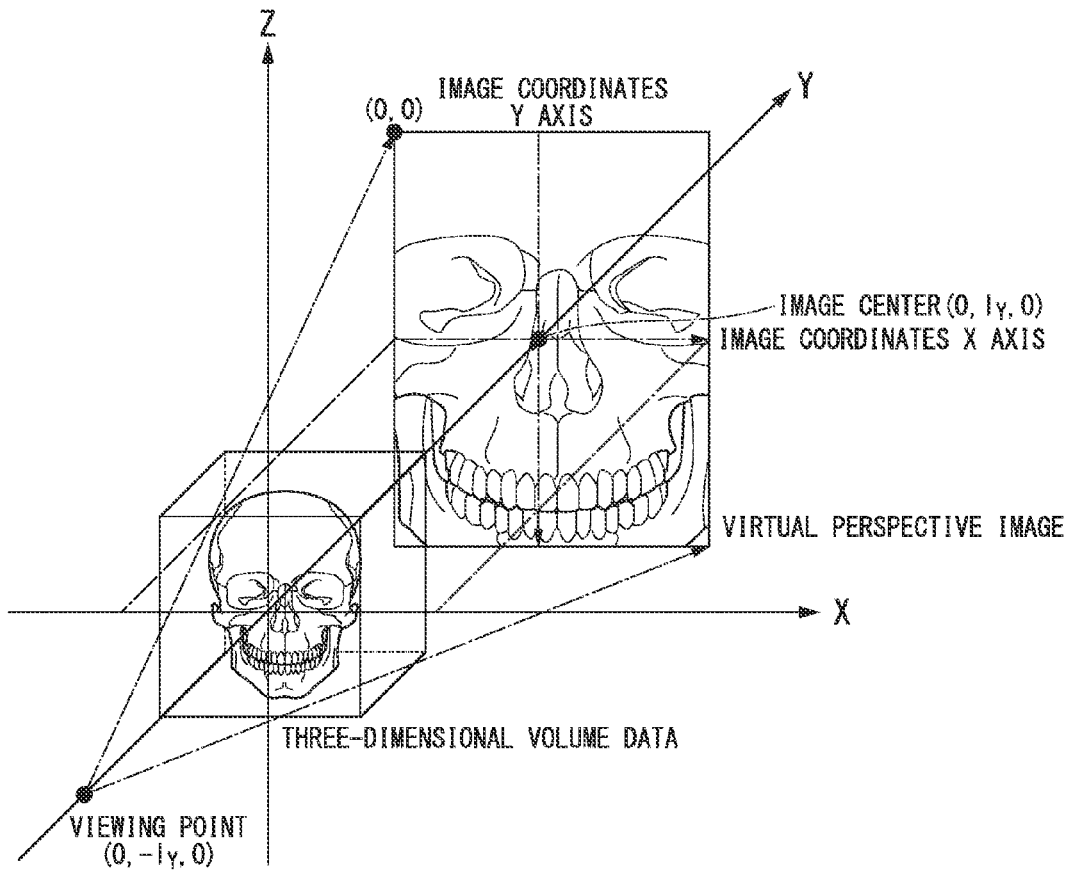
FIG. 5 is a drawing showing an example of the coordinates of the viewing point and the virtual perspective image set by the image processor 100.

The virtual perspective image generator 112 sets the coordinates of the virtual perspective image (step S122). The processing to set the coordinates of the virtual perspective image associates each pixel in a virtual perspective image with coordinates in the reference coordinate system. The viewing point coordinates $(1_X, 1_Y, 1_Z)$ and the virtual perspective image coordinates are set, for example, as shown in FIG. 5. FIG. 5 shows an example of the viewing point and the virtual perspective image coordinates set by the image processor 100 in the first embodiment. As shown in FIG. 5, the coordinates of the viewing point, the virtual perspective image, and the target A in the reference coordinate system are set so that the viewing point and the virtual perspective image sandwich the target A represented by the three-dimensional volume data.

In the example shown in FIG. 5 the viewing point coordinates are set coordinates on the Y axis $(0, -1_Y, 0)$ in the reference coordinate system. The center of the virtual perspective image is set to coordinates $(0, 1_Y, 0)$ on the Y axis in the reference coordinate system. The x axis and the y axis in the image coordinate system (x, y, z) of the virtual perspective image are set to be parallel to the X axis and Z axis in the reference coordinate system. That is, the x-y plane in the virtual perspective image is set to perpendicularly intersect the Y axis in the reference coordinate system.

At this point, let us take the number of pixels in the horizontal direction (x-axis direction) of the virtual perspective image to be XP and the number of pixels in the vertical direction (y-axis direction) of the virtual perspective image to be YP. Further, take the length of the virtual perspective image in the horizontal direction to be XL mm and the length of the virtual perspective image in the vertical direction to be YL mm. In this case, the coordinates $(I_X, I_Y, I_Z)$ in the reference coordinate system of each pixel (x, y) in the virtual perspective image are given by the following Equation (1).

[Equation 1]

$$\begin{cases} I_X = -\frac{XL}{2} + x \cdot \frac{XL}{XP} \\ I_Y = l_Y \\ I_Z = \frac{YL}{2} - y \cdot \frac{YL}{YP} \end{cases} \quad (1)$$

The virtual perspective image generator 112 joins the viewing point $(0, -1_Y, 0)$ with each pixel $(I_X, I_Y, I_Z)$ in the virtual perspective image using straight lines m. The virtual perspective image generator 112 acquires the voxel values V (X, Y, Z) of the three-dimensional volume data existing on the straight line m along the straight line m from the viewing point $(0, -1_Y, 0)$ (step S123).

The virtual perspective image generator 112 calculates the weighted values V' with respect to each acquired voxel value V, using the following Equation (2) (step S124). In Equation (2), W (V(X, Y, Z)) is the weighting, based on the voxel value V, which is established so that the appearance of the virtual perspective image resembles that of the X-ray image.

[Equation 2]

$$V'(X,Y,Z) = V(X,Y,Z) \cdot W(V(X,Y,Z)) \quad (2)$$

The virtual perspective image generator 112, using the weighted voxel values V', calculates the pixel value of each pixel of the virtual perspective image to generate a virtual perspective image (step S125). The pixel value I(x, y) of each pixel of the virtual perspective image is calculated, for example, by either of the following Equation (3) and Equation (4). In Equation (3), exp(a) is a function representing the a-th power of the natural logarithm (base e).

[Equation 3]

$$I(x,y) = \exp(-\int V(X,Y,Z) \cdot W(V(X,Y,Z)) dl) \quad (3)$$

[Equation 4]

$$I(x,y) = \int V(X,Y,Z) \cdot W(V(X,Y,Z)) dl \quad (4)$$

If the virtual perspective image generator 112 obtains pixel values in accordance with the relative size of the accumulated values of the values V', which are the voxel values obtained along the straight lines m with weighting applied, it may calculate the pixel values I(x, y) by something other than Equation (3) or Equation (4).

The virtual perspective image generator 112 switches the processing to weight the voxel values V in accordance with the tube voltage. If the tube voltage is equal to or more than a predetermined threshold, the virtual perspective image generator 112 references the weighting table stored in the storage unit 111 and applies weighting to each voxel value V(X, Y, Z). If the tube voltage is less than the predetermined threshold, the virtual perspective image generator 112 uses the weighting W set by the user to apply weighting to each voxel value V(X, Y, Z). That is, the virtual perspective image generator 112, based on the imaging parameters, establishes the weighting coefficient for each individual voxel value V(X, Y, Z) of the three-dimensional volume data.

The user sets the weighting W by, for example, operating the operation device 220 of the control apparatus 200, so that the appearance of the virtual perspective image is similar to the appearance of the perspective image. The weighting W set by the user may be a different value for each voxel value V or may be the same value for all voxel values V. Alternatively, a predetermined value of weighting W may be used instead of a weighting value W set by the user.

The virtual perspective image generator 112, based on the weighted voxel values V', calculates the pixel value for each pixel of the virtual perspective image to generate the virtual perspective image. The virtual perspective image generator 112 sends the generated virtual perspective image to the control apparatus 200.

The image processor 100 determines the method of the virtual perspective image generator 112 generating a virtual perspective image, in accordance with the tube voltage with which the perspective image was captured. Specifically, the virtual perspective image generator 112 switches the weighting W applied to the voxel value V when generating the virtual perspective image, depending upon whether or not the tube voltage (imaging parameter) is equal to or more than a threshold. The image processor 100, by determining the method of generating the virtual perspective image in accordance with whether or not the imaging parameter satisfies a predetermined condition, can change the appearance of the virtual perspective image. If the imaging parameter is the manufacturer or model of the radiographic imaging apparatus 400, the manufacturer name or model name may be used as a condition instead of the threshold.

Figure 6:
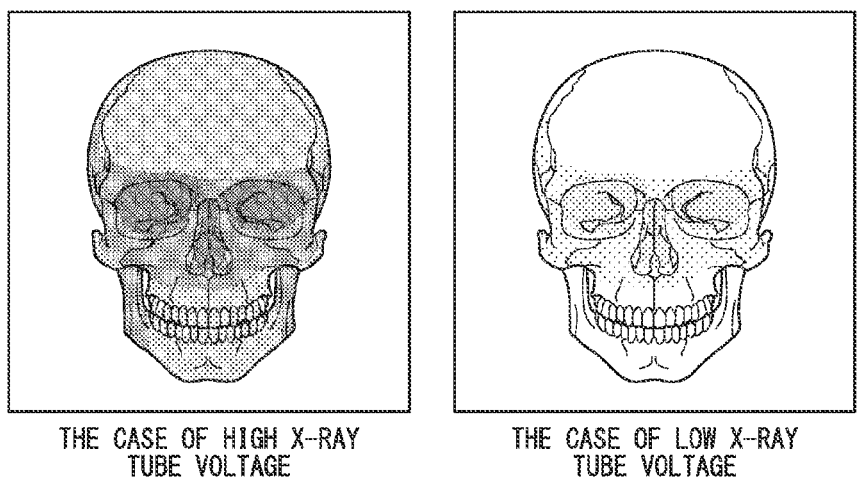
FIG. 6 is a drawing showing the difference in the perspective image caused by the difference in the X-ray tube voltage.

When the tube voltages in the radiographic imaging apparatus 400 differ, the appearance of perspective images (for example, contrast or shade) will be different. FIG. 6 shows the difference in the perspective image caused by the difference in the X-ray tube voltage, this drawing showing an example of a perspective image at a high X-ray tube voltage and a perspective image at a low X-ray tube voltage. As shown in FIG. 6, the perspective image with a high voltage has lower contrast than a perspective image with a low tube voltage. Also, the higher the tube voltage, the more the noise in the perspective image is reduced.

By the image processor 100 varying the appearance of a virtual perspective image to match the appearance of a perspective image that varies in accordance with the tube voltage, it is possible to reduce the difference in appearance between a perspective image and a virtual perspective image. Reducing the difference in appearance between the perspective image and the virtual perspective image facilitates comparison by the user of a perspective image and a virtual perspective image displayed by the control apparatus 200.

Additionally, by comparing the perspective image and the virtual perspective image after correction of the shift of the target A, verification that the shift therebetween has been corrected can be easily done. In the verification of the shift of the target A, for example, a single image is displayed to the user, in which, in a checkerboard pattern, partial regions of the perspective image are disposed in black regions and partial regions of the virtual perspective image are disposed in the white regions. Doing this facilitates verification by the user of shift at the border of the combined image, and facilitates judgment of whether or not correction of shift of the target A has been possible.

Second Embodiment

Figure 7:
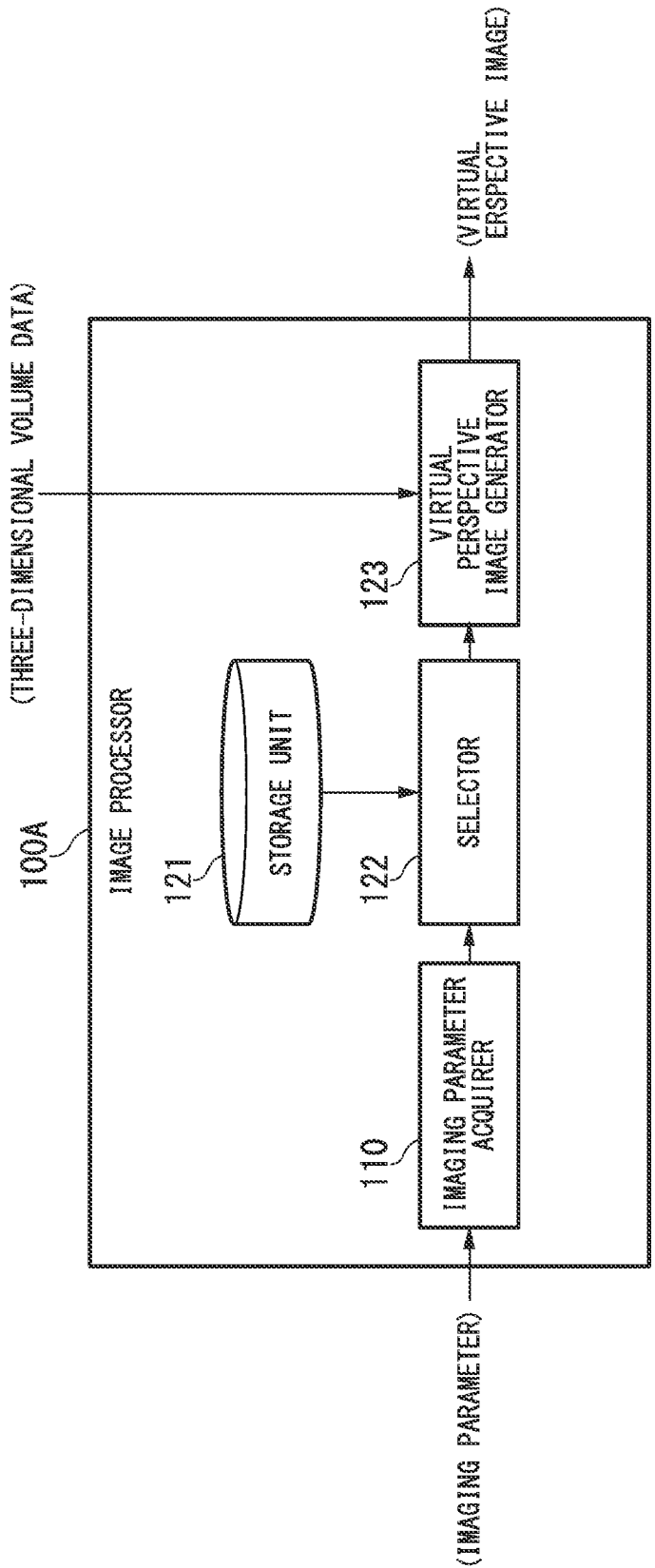
FIG. 7 is a block diagram showing the configuration of an image processor 100A.

FIG. 7 is a block diagram showing the configuration of an image processor 100A in the second embodiment. As shown in FIG. 7, the image processor 100A has the imaging parameter acquirer 110, a storage unit 121, a selector 122, and a virtual perspective image generator 123. In the image processor 100A, functional parts the same as those in the image processor 100 (FIG. 2) in the first embodiment are assigned the same reference numerals, and the descriptions thereof will be omitted. In the description of the second embodiment as well, similar to the first embodiment, the description will be of taking the tube voltage as the imaging parameter. The tube voltage in the following description may be replaced by information regarding a different imaging parameter.

The storage unit 121 has stored therein beforehand n weighting tables Ti (i=1, 2, . . . , n). The weighting tables Ti stored in the storage unit 121 each correspond to a different tube voltage Ki. Each weighting table Ti can be referenced by the tube voltage Ki. Each weighting table Ti indicates the relationship of correspondence between the weight Wi calculated based on a plurality of reference perspective images captured at the corresponding tube voltage Ki and the voxel value V. That is, a weighting table Ti associates a weight Wi established so as to minimize the difference in appearance between a perspective image captured at a tube voltage Ki and a virtual perspective image with a voxel value V.

The selector 122 acquires the tube voltage from the imaging parameter acquirer 110. The selector 122 reads out from the storage unit 121 the weighting table Ti corresponding to the acquired tube voltage, selects the read-out weighting table Ti to be used in generating a virtual perspective image, and sends the selected weighting table to the virtual perspective image generator 123.

The virtual perspective image generator 123 acquires the weighting table selected by the selector 122. The virtual perspective image generator 123 reads out three-dimensional volume data from the database 310 of the planning apparatus 300 and, similar to the virtual perspective image generator 112 in the first embodiment, references a weighting table and applies weighting to each voxel value V(X, Y, Z). The virtual perspective image generator 123, based on the weighted voxel values V', calculates the pixel value of each pixel of the virtual perspective image to generate the virtual perspective image. The virtual perspective image generator 123 sends the generated virtual perspective image to the control apparatus 200.

Figure 8:
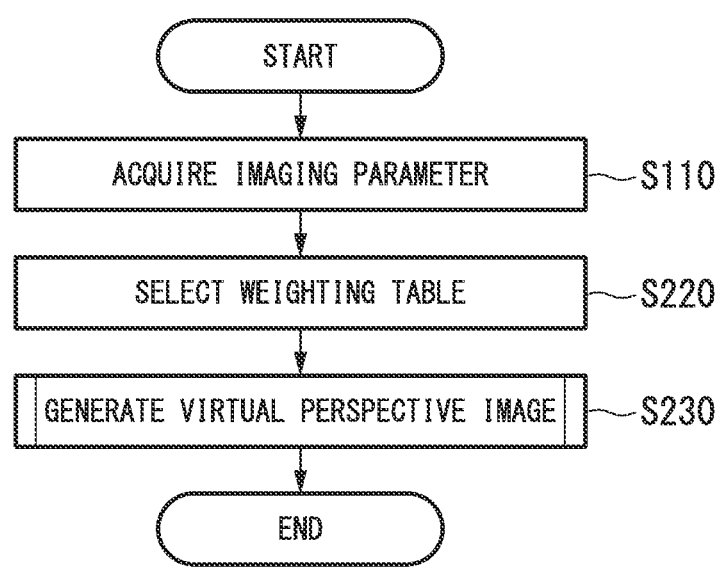
FIG. 8 is a flowchart showing the processing when the image processor 100A generates a virtual perspective image.

FIG. 8 is a flowchart showing the processing when the image processor 100A of the second embodiment generates a virtual perspective image. In the image processor 100A, when the virtual perspective image generation starts, the imaging parameter acquirer 110 acquires as the imaging parameter the tube voltage k when the perspective image was captured (step S110). The imaging parameter acquirer 110 sends the acquired tube voltage k to the selector 122.

The selector 122 acquires the tube voltage k from the imaging parameter acquirer 110. The selector 122 reads from the storage unit 121 the weighting table Ti corresponding to the tube voltage Ki that coincides with the tube voltage k, or the weighting table Ti corresponding to the tube voltage Ki the closest to the tube voltage k. The selector 122 selects the read-out weighting table Ti as the weighting table to be used in generating the virtual perspective image (step S220) and sends the selected weighting table to the virtual perspective image generator 123.

The virtual perspective image generator 123 generates a virtual perspective image, based on the three-dimensional volume data and the weighting table selected by the selector 122 (step S230). The virtual perspective image generator 123 sends the generated virtual perspective image to the control apparatus 200.

In the image processor 100A in the second embodiment, the selector 122 selects, from the preliminarily established weighting tables each corresponding to one of a plurality of tube voltages, one weighting table in accordance with the tube voltage k used when the perspective image was captured. Based on the selected weighting table, the virtual perspective image generator 123 applies weighting to the voxel values in the three-dimensional volume data to generate a virtual perspective image. That is, the virtual perspective image generator 123, by changing the method of generating the virtual perspective image in accordance with the tube voltage (imaging parameter), can change the appearance of the virtual perspective image. Thus, by changing the appearance of the virtual perspective image to match the changing appearance of the perspective image in accordance with the tube voltage, it is possible to reduce the difference in appearance between the perspective image and the virtual perspective image.

If there is no weighting table for a tube voltage Ki coinciding with the tube voltage k, the selector 122 may calculate a new weighting table, based on the weighting tables stored in the storage unit 121. For example, the selector 122 selects two weighting tables in order of descending closeness of the tube voltage Ki to the acquired tube voltage k associated with the weighting tables stored in the storage unit 121, and calculates a new weighting table based on the two selected weighting tables. The average value or weighted average value of weights W corresponding to the voxel values in the two weighting tables is used as the weight W corresponding to each voxel value V in the new weighting table. For example, if the weighted average value is used, the weighted average value is calculated by taking the ratio between the differences between the tube voltage k and two tube voltages Ki as the weight with respect to the weight W.

The selector 122 may use three or more tables when generating the weights in a new weighting table. The selector 122 may store the newly generated weighting table into the storage unit 121 in association with the tube voltage k. Doing this enables the reduction of the difference in appearance between the perspective image and the virtual perspective image even when there is no weighting table for a tube voltage Ki coinciding with the tube voltage k. The selector 122 may generate a new weighting table by linear interpolation, using weighting tables stored in the storage unit 121.

If there is no weighting table for the tube voltage Ki coinciding with the tube voltage k, the selector 122 may select from the weighting tables stored in the storage unit 121 weighting tables corresponding to two tube voltages Ki that are close to the tube voltage k. In this case, the virtual perspective image generator 123, based on the two weighting tables selected by the selector 122, generates two virtual perspective image, based on each of the weighting tables. The virtual perspective image generator 123 sends the two generated virtual perspective images to the control apparatus 200, which displays the two virtual perspective images and the perspective image next to each other. If there is no weighting table for the tube voltage Ki coinciding with the tube voltage k, by generating the above-noted two virtual perspective images and presenting them to the user, it is possible to make a comparison, based on the preference of the user or a virtual perspective image in accordance with the internal form of the target A.

Third Embodiment

Figure 9:
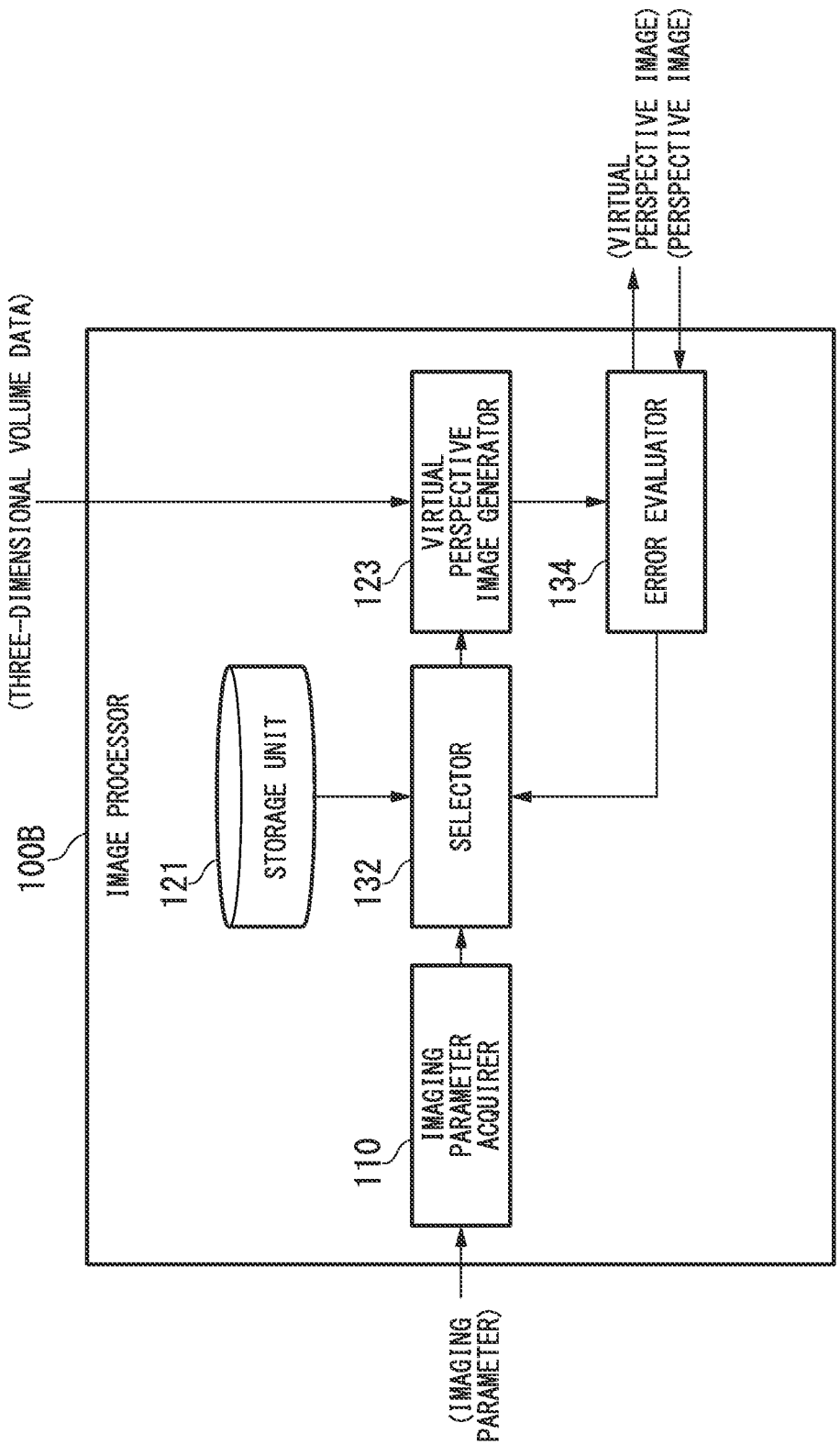
FIG. 9 is a block diagram showing the configuration of an image processor 100B.

FIG. 9 is a block diagram showing the configuration of an image processor 100B in the third embodiment. As shown in FIG. 9, the image processor 100B has the imaging parameter acquirer 110, the storage unit 121, a selector 132, the virtual perspective image generator 123, and an error evaluator 134. In the image processor 100B, functional parts that are the same as those in the image processor 100 in the first embodiment (FIG. 2) or the image processor 100A in the second embodiment (FIG. 7) are assigned the same reference numerals, and the descriptions thereof will be omitted. In the description of the third embodiment as well, similar to the first and second embodiments, the description will be of taking the tube voltage as the imaging parameter.

The selector 132 acquires the tube voltage from the imaging parameter acquirer 110 and reads out from the storage unit 121 a weighting table corresponding to the acquired tube voltage. The selector 132, in response to control by the error evaluator 134, selects a new weighting table corresponding to a different tube voltage that is close to the tube voltage corresponding to the currently selected weighting table. The selector 132 sends the newly selected weighting table to the virtual perspective image generator 123.

The error evaluator 134 acquires a virtual perspective image generated by the virtual perspective image generator 123 and a perspective image captured by the radiographic imaging apparatus 400. The error evaluator 134 may acquire directly from the radiographic imaging apparatus 400 or acquire from the radiographic imaging apparatus 400 via the control apparatus 200. The error evaluator 134 calculates the error between the virtual perspective image and the perspective image. The error evaluator 134 evaluates the calculated error and controls the selector 132 in accordance with the evaluation result.

Figure 10:
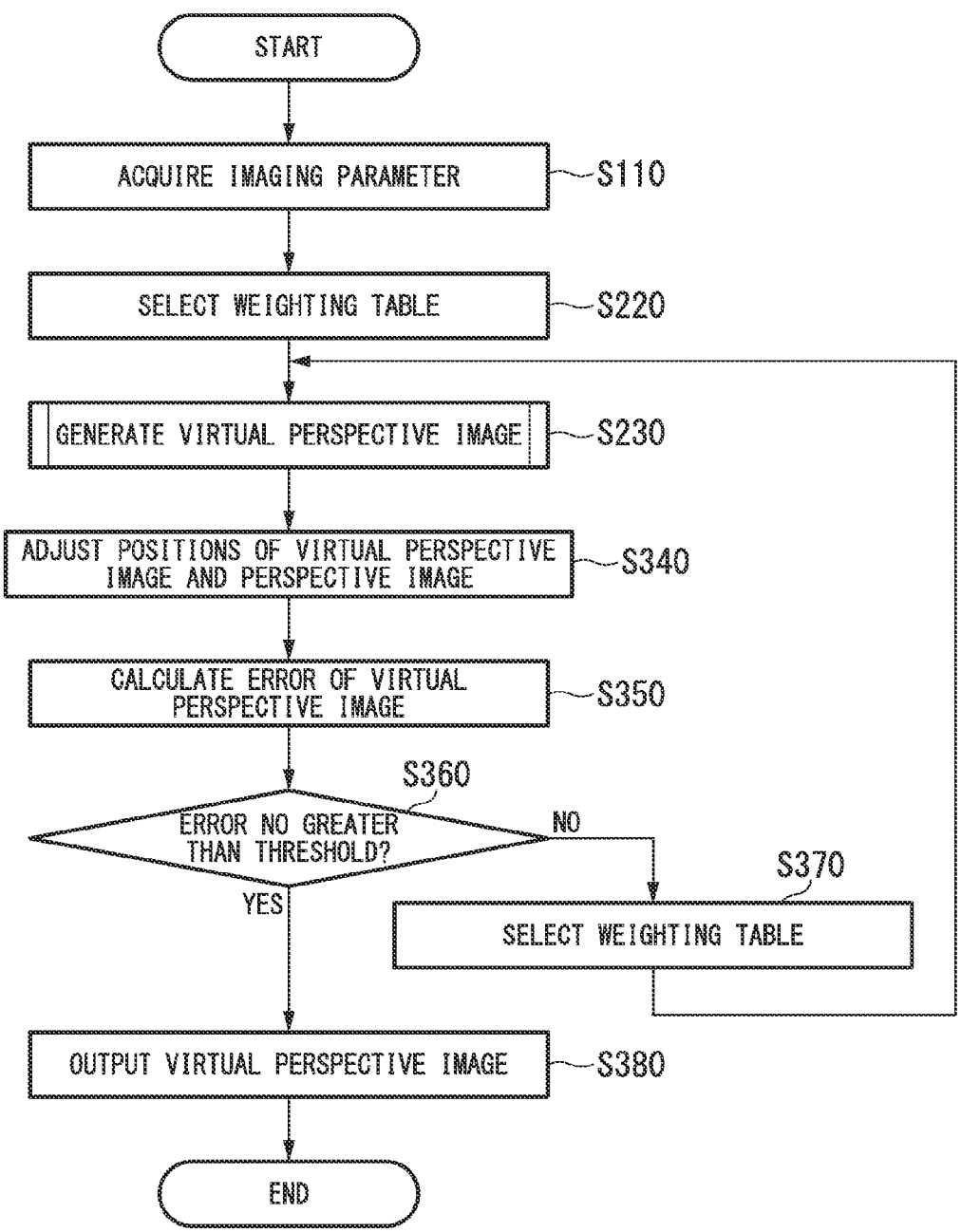
FIG. 10 is a flowchart showing the processing when the image processor 100B generates a virtual perspective image.

FIG. 10 is a flowchart showing the processing when the image processor 100B in the third embodiment generates a virtual perspective image. In the image processor 100B, when the virtual perspective image generation starts, the imaging parameter acquirer 110 acquires the tube voltage k when the perspective image was captured as an imaging parameter (step S110). The imaging parameter acquirer 110 sends the acquired tube voltage k to the selector 132.

The selector 132 reads out one weighting table from among the plurality of weighting tables stored in the storage unit 121, based on the tube voltage k acquired from the imaging parameter acquirer 110. When doing this, the weighting table read out by the selector 132 is the weighting table corresponding to the tube voltage Ki closest to the tube voltage k. The selector 132 sends the read-out weighting table to the virtual perspective image generator 123. That is, the selector 132 selects a weighting table to be used in generating a virtual perspective image based on the tube voltage k (step S220).

If there are weighting tables in the storage unit 121 for the tube voltage Ki closest to the tube voltage k, the selector 132 may generate a new weighting table using the weight Wi of the weighting tables Ti corresponding to a plurality of the tube voltages Ki. In this case, the selector 132, similar to the selector 122 in the second embodiment, generates a new weighting table from the weighting tables stored in the storage unit 121.

The virtual perspective image generator 123 generates a virtual perspective image, based on the three-dimensional volume data and the weighting table selected by the selector 132 (step S230) and sends the generated virtual perspective image to the error evaluator 134.

In order to evaluate the error of the virtual perspective image generated by the virtual perspective image generator 123 with respect to the perspective image (X-ray image), the error evaluator 134 performs position adjustment of the virtual perspective image and the perspective image. For example, the error evaluator 134 calculates the difference in pixel values for each of the pixels overlapping when the virtual perspective image and perspective image are superimposed. The error evaluator 134 moves one of the images so that sum of the absolute values of the differences is minimum, so as to perform position adjustment (step S340). The error evaluator 134 may perform position adjustment by detecting the position at which the sum of squares of differences, rather than the sum of the absolute values of the differences is minimum.

The error evaluator 134 calculates the error of the virtual perspective image with respect to the perspective image (step S350). As long as the error evaluator 134 performs the above-described position adjustment, the minimum value of the sum of the absolute values of the differences or the sum of the square of the differences calculated at the time of position adjustment may be taken as the error. The error evaluator 134 may calculate the differential for each adjacent pixel from the difference for each pixel calculated at the time of position adjustment, taking the error to be the sum of the absolute value of the calculated differentials or the sum of the squares of the calculated differentials. Alternatively, the error evaluator 134 may use as the error of the virtual perspective image the sum of the absolute values of the differences of each pixel with respect to a median value (the difference of pixel values–the median value). The sum of the absolute values of the ratio of the pixel value difference between each pixel and the median value (pixel value difference/median value) may be used as the virtual perspective image error. The average value may be used instead of the median value in calculating the error. The error evaluator 134 may use a different method of evaluating the difference between two images to calculate the error of the virtual perspective image with respect to the perspective image.

The error evaluator 134 judges whether or not the calculated error is no greater than a predetermined threshold (step S360). At step S360, if the error is no greater than the threshold (YES at step S360), the error evaluator 134 outputs the virtual perspective image to the control apparatus 200 (step S380) and ends the processing of generating the virtual perspective image.

At the judgment of step S360, if the error exceeds the threshold (NO at step S360), the error evaluator 134 sends an instruction to the selector 132 to select a weighting table anew.

In response to the instruction from the error evaluator 134, the selector 132 selects a weighting table anew. When this is done, the selector 132 selects a new weighting table so that the error of the virtual perspective image is made smaller. For example, the selector 132, of the weighting tables stored in the storage unit 121, reads out a weighting table corresponding to a tube voltage closest to the tube voltage associated with the currently selected weighting table. The selector 132 selects the read-out weighting table as the new weighting table (step S370).

At step S370, if a virtual perspective image is already generated using the new weighting table, the selector 132 selects the weighting table of the tube voltage that is the second closest to the tube voltage associated with the currently selected weighting table as the new weighting table.

Alternatively, the selector 132 calculates a new weighting table using the currently selected weighting table and the weighting table corresponding to the tube voltage closest to the tube voltage associated with the currently selected weighting table. The selector 132 selects the calculated weighting table as the new weighting table. The new weighting table is calculated the same as by the selector 122.

The selector 132 sends the selected weighting table to the virtual perspective image generator 123. Thereafter, the virtual perspective image generator 123 generates a virtual perspective image based on the newly selected weighting table (step S230), and the processing of step S340 to step S360 is repeated.

In the image processor 100B in the third embodiment, the error evaluator 134 evaluates the error between the virtual perspective image generated by the virtual perspective image generator 123 and the perspective image and controls the selector 132 so that the error is no greater than the threshold. By repeatedly selecting a weighting table as the initial value of the weighting table selected based on the imaging parameter, the selector 132 can make the difference between the appearances of the perspective image and the virtual perspective image small.

Figure 11:
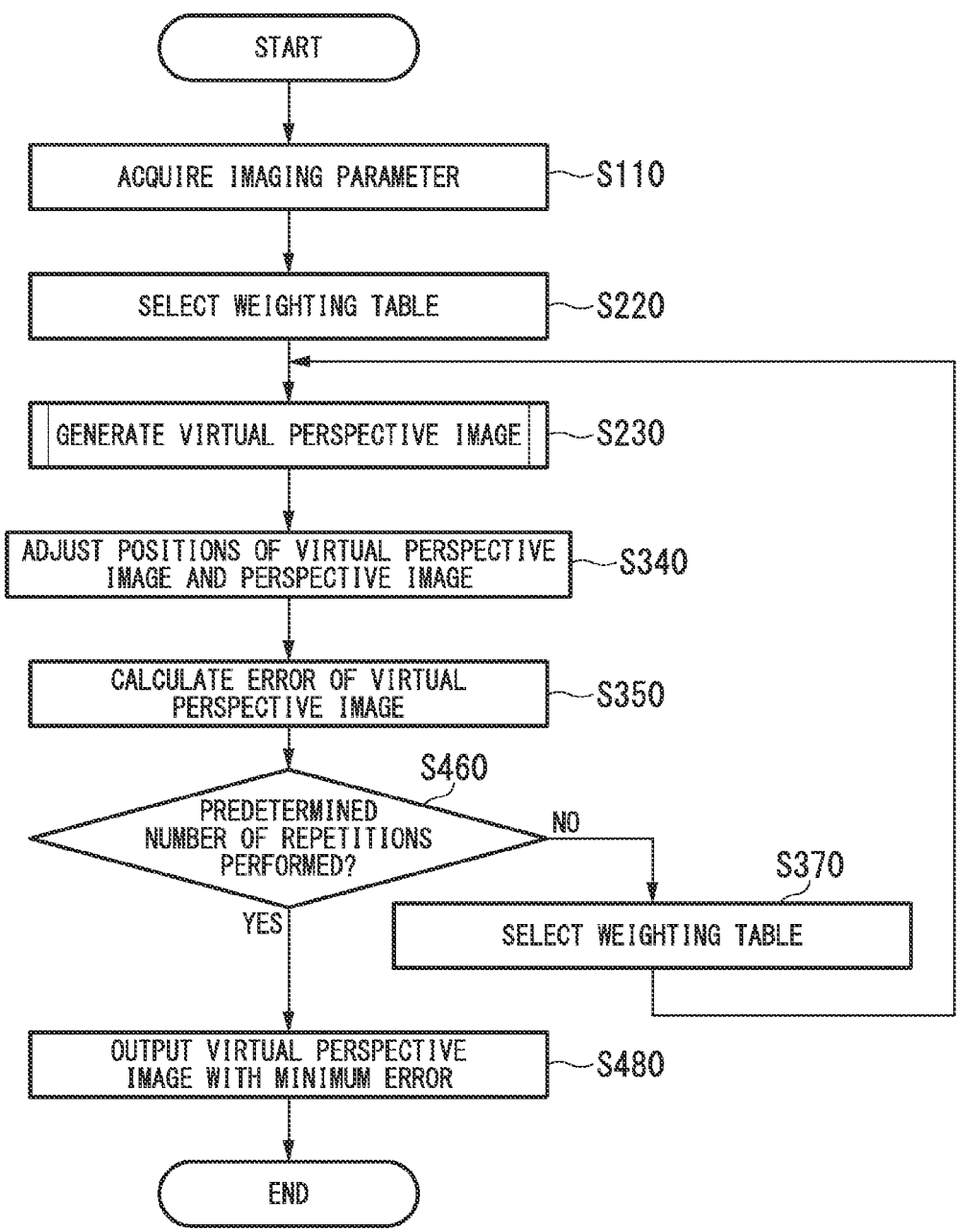
FIG. 11 is a flowchart showing the processing when the image processor 100B generates a virtual perspective image.

The error evaluator 134 may cause the selector 132 to select the weighting table repeatedly a predetermined number of times and select from a plurality of generated virtual perspective image a virtual perspective image for which the error is minimum and no greater than the threshold value. The processing in this case is shown in FIG. 11. FIG. 11 is a flowchart showing the processing when the image processor 100B in the third embodiment generates a virtual perspective image.

In the flowchart shown in FIG. 11 step S460 and step S480 are different from the flowchart shown in FIG. 10. At step S460, the error evaluator 134 judges whether or not evaluation of the error of the virtual perspective image has been repeated a predetermined number of times. At step S480, the error evaluator 134 outputs to the control apparatus 200 the virtual perspective image corresponding to the smallest error, from among the errors of the virtual perspective image generated the predetermined number of times.

Because the virtual perspective image generation processing shown in FIG. 11 generates a virtual perspective image a predetermined number of times without stopping, even if the error has reached the minimum value, it is possible to generate a virtual perspective image with a smaller difference in appearance. That is, it is possible to increase the possibility of further reducing the difference in appearance between the perspective image and the virtual perspective image.

Fourth Embodiment

Figure 12:
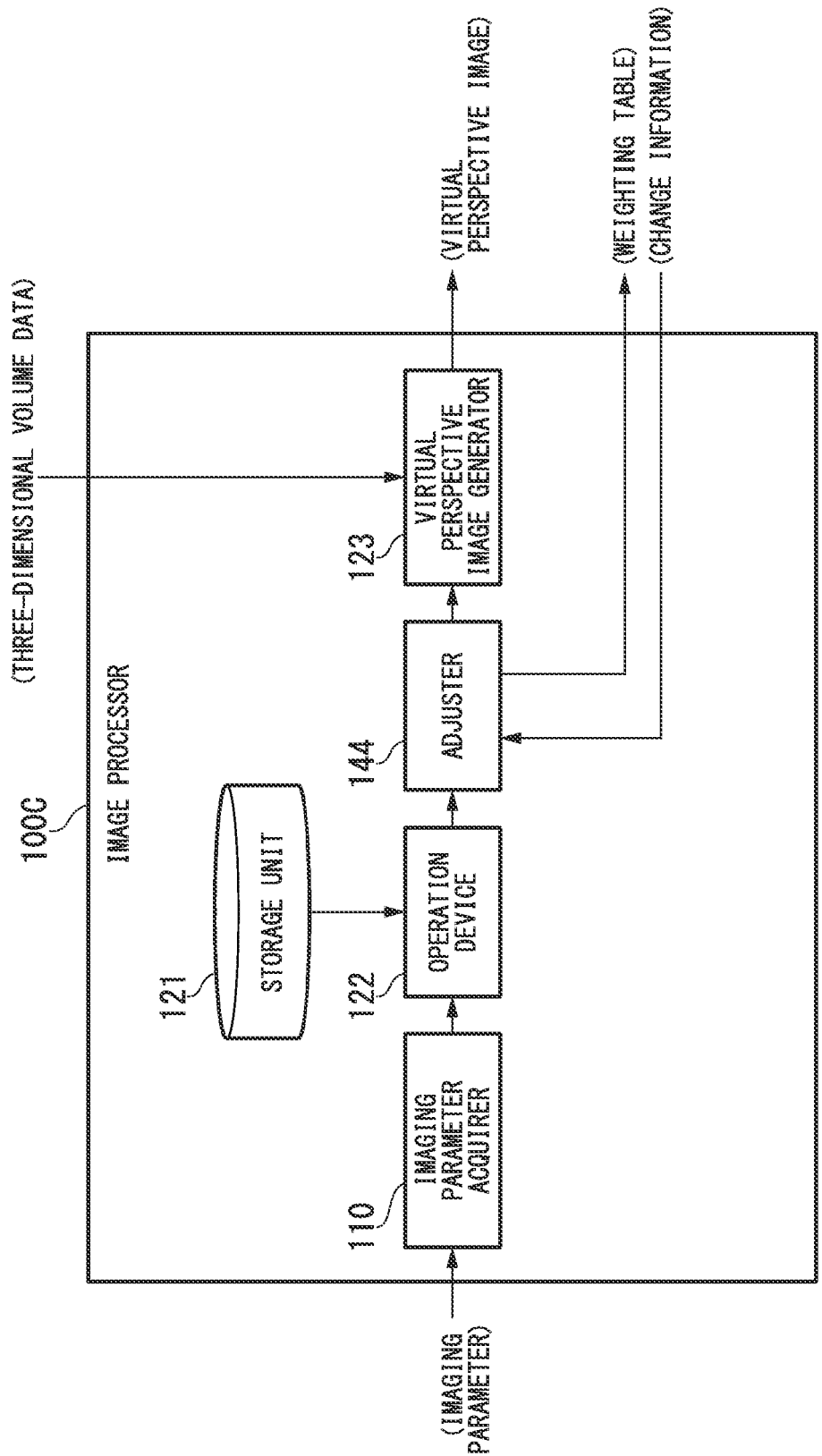
FIG. 12 is a block diagram showing the configuration of an image processor 100C.

FIG. 12 is a block diagram showing the configuration of an image processor 100C in the fourth embodiment. As shown in FIG. 12, the image processor 100C has the image parameter acquirer 110, the storage unit 121, the selector 122, an adjuster 144, and the virtual perspective image generator 123. In the image processor 100C, functional parts that are the same as those in the image processors of the first to third embodiments (FIG. 2, FIG. 7, and FIG. 9) are assigned the same reference numerals, and the descriptions thereof will be omitted. In the description of the fourth embodiment as well, similar to the first to third embodiments, the description will be of taking the tube voltage as the imaging parameter.

The adjuster 144 acquires a weighting table selected by the selector 122, sends the acquired weighting table to the control apparatus 200, and causes the display 210 of the control apparatus 200 to display it. The adjuster 144 acquires change information with respect to the weighting table via the operation device 220 of the control apparatus 200. The change information includes the change values with respect to the weight of each of the voxel values in the weighting table. The change values may be the weight values after the change, or may be values to be added to or subtracted from the weight values before the change.

Figure 13:
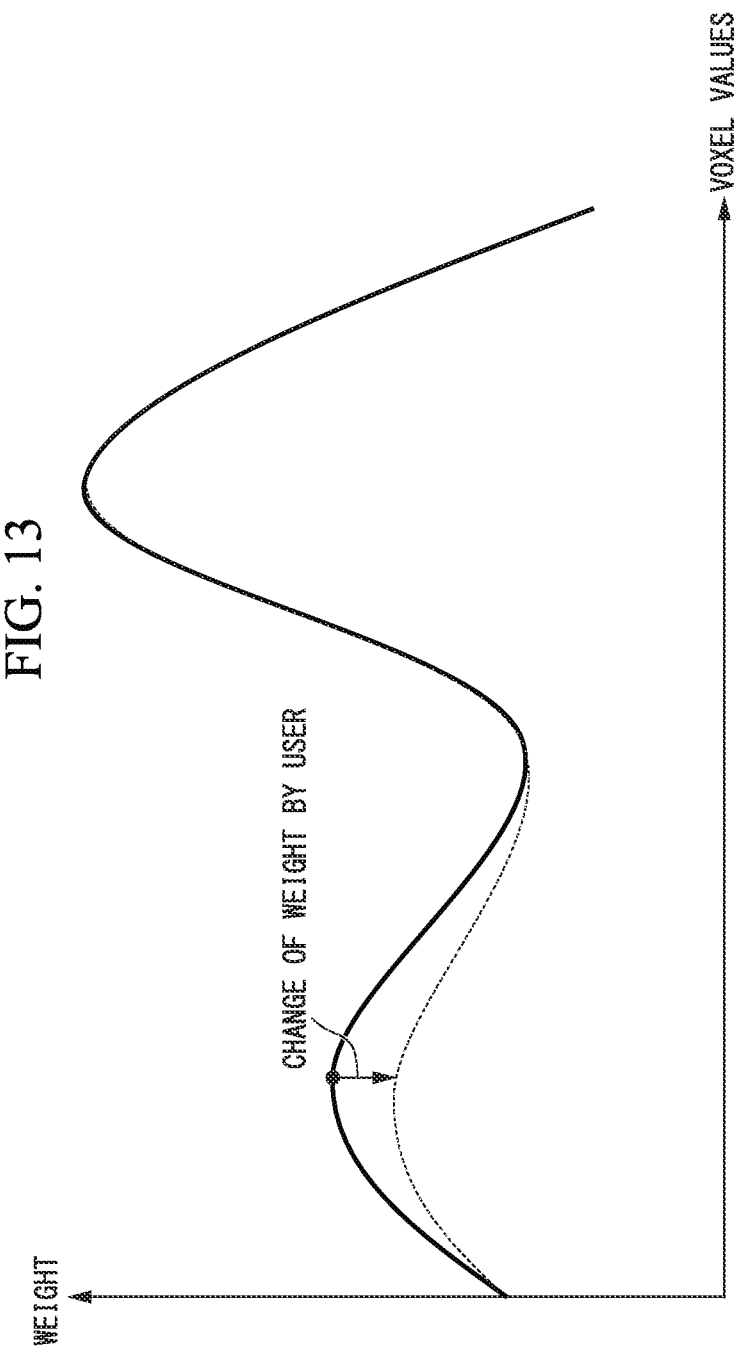
FIG. 13 is a drawing showing a weighting table display example.

The adjuster 144 may, for example as shown in FIG. 13, by causing the display of the weight corresponding to each voxel value in the weighting table, cause a display of the weighting table to the user. FIG. 13 shows an example of a weighting table display, in which the horizontal axis represents the voxel values and the vertical axis indicates the weight. The graph in FIG. 13 shows the weight of each of the voxel values in the weighting table. The user selects an arbitrary point on the graph and moves the selected point along the vertical axis to change the weight with respect to an arbitrary voxel value. The adjuster 144 acquires change information indicating a combination of the weight changed by the user and the voxel value associated with that weight.

The adjuster 144 changes the weighting table selected by the selector 122, based on the acquired change information. The weighting table is changed by replacing the combination of voxel values and weights in the weighting table with the combination of voxel values and weights included in the change information. The adjuster 144 sends the weighting table resulting from the change to the virtual perspective image generator 123.

Figure 14:
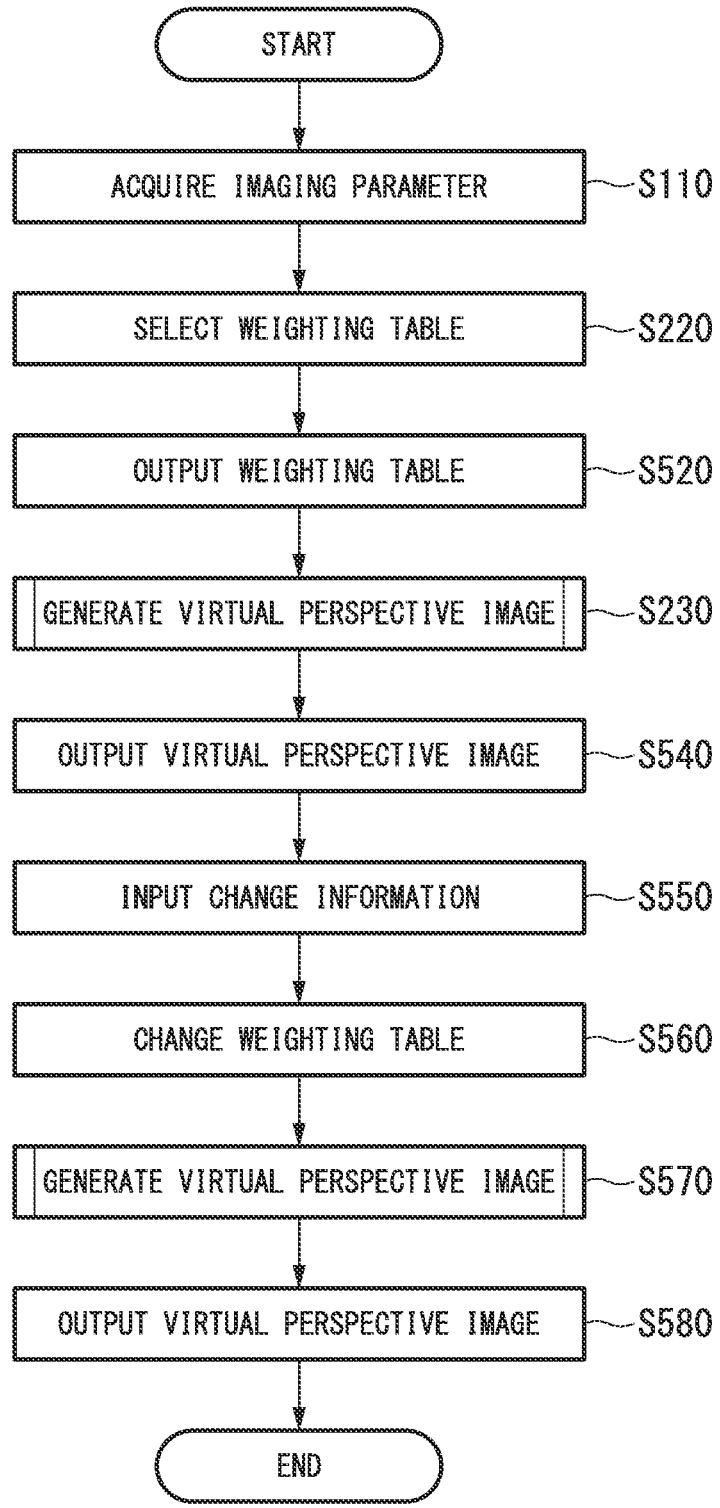
FIG. 14 is a flowchart showing the processing when the image processor 100C generates a virtual perspective image.

FIG. 14 is a flowchart showing the processing when the image processor 100C in the fourth embodiment generates a virtual perspective image. In the image processor 100C, when the virtual perspective image generation starts, the imaging parameter acquirer 110 acquires as the imaging parameter the tube voltage k when the perspective image was captured (step S110). The imaging parameter acquirer 110 sends the acquired tube voltage k to the selector 122.

The selector 122, based on the tube voltage k acquired from the imaging parameter acquirer 110, reads out one weighting table from among the plurality of weighting tables stored in the storage unit 121 (step S220). The selector 122 sends the read-out weighting table to the adjuster 144. The adjuster 144 sends the weighting table acquired from the selector 122 to the virtual perspective image generator 123 and the control apparatus 200 (step S530).

The virtual perspective image generator 123 generates a virtual perspective image, based on three-dimensional volume data and the weighting table acquired from the adjuster 144 (step S230). The virtual perspective image generator 123 sends the generated virtual perspective image to the control apparatus 200 (step S540).

The adjuster 144 acquires, via the control apparatus 200, change information established by the user while comparing the virtual perspective image and the perspective image (step S550). The adjuster 144, based on acquired change information, changes the weighting table acquired from the selector 122 (step S560). The adjuster 144 sends the weighting table resulting from the change to the virtual perspective image generator 123.

The virtual perspective image generator 123 generates a virtual perspective image, based on the three-dimensional volume data and the weighting table after the change acquired from the adjuster 144 (step S570). The generation of the virtual perspective image using the changed weighting table is the same processing as the generation of the virtual perspective image at step S230. The virtual perspective image generator 123 outputs the virtual perspective image generated using the changed weighting table after the change to the control apparatus 200 (step S580) and ends the processing of generating the virtual perspective image.

In the image processor 100C in the fourth embodiment, the adjuster 144 changes the weighting table selected by the selector 122 in accordance with operations by a user. The relationship of correspondence between the voxel values in the three-dimensional volume data and the internal tissue of the target A is known. If the three-dimensional volume data is made up of X-ray CT values, the CT values of bone tissue are in the range from approximately 500 to 1000. Although the CT values of soft tissue depend upon the location, the CT values of soft tissue are in the range from approximately 40 to 80. The CT values in the lung are around −500 and the CT values of fat are values in the range from approximately −100 to −60. The weights of voxel values corresponding to the internal tissues of the target A are changed by the user via the control apparatus 200, and the image processor 100C acquires change information indicating these changes. The image processor 100C, by changing the weighting table based on the acquired change information, can change the appearance of regions in the virtual perspective image in which internal tissue intended by the user exists.

As described above, the image processor 100C changes the method of generating the virtual perspective image based on the tube voltage and change information, thereby enabling a change in the appearance of the virtual perspective image. Changing the appearance of the virtual perspective image enables a reduction of the difference in appearance between the perspective image and the virtual perspective image.

Instead of the graph such as shown in FIG. 13, the weighting table displayed to the user may be a display, such as shown in FIG. 15, of the weights with respect to arbitrary intervals of voxel values. FIG. 15 shows a weighting table display example, in which the horizontal axis represents voxel values and the vertical axis represents weights. As shown in FIG. 15, a slide bar corresponding to the weight of an arbitrary voxel value is displayed, and the change information is indicated by the user moving the slide bar so that the change of weight with respect to the voxel value is received and acquired.

In addition to the weight of the voxel values corresponding to the slide bar, the weight of voxel values where there is no slide bar may be interpolated, using the weights of voxel values specified by the slide bar. For example, Lagrange interpolation or spline interpolation is used in the interpolation.

The change of weighting with respect to voxel values may be done by a method other than shown in FIG. 13 and FIG. 15. For example, the weights of each voxel value may be numerically displayed and the change of weights may be received by the user changing the values. Also, the change of weights may be received by the user changing the graph shown in FIG. 13 to a graph of curved line of an arbitrary shape.

Because the relationship of correspondence between internal tissue and the voxel values in FIG. 15 is known, the names of internal tissue may be displayed in proximity to corresponding voxel values. A slide bar may be displayed for each name of an internal tissue, and change information may be acquired by the user operating the slide bar.

The adjuster 144 may store the weighting table changed based on the change information into the storage unit 121 in association with the imaging parameter. Doing this eliminates the need for an operation to change the weighting table when repeatedly generating a virtual perspective image corresponding to a perspective image captured with the same imaging parameter, thereby reducing the burden on the user. When the changed weighting table is stored in the storage unit 121, it may be associated with identification information identifying the target A, the imaging parameter, and the weighting table. Doing this enables accumulation in the storage unit 121 of weighting tables corresponding to the difference in appearance of the perspective image for each target A, thereby reducing the burden on the user.

According to an image processor of at least one above-described embodiment, by having a virtual perspective image generator that changes the method of generating a virtual perspective image in accordance with the imaging parameter at the time the radiographic imaging apparatus 400 captured a perspective image, it is possible to reduce the difference in appearance between the perspective image and the virtual perspective image.

Although the above-noted embodiments were described using the tube voltage as the imaging parameter, other information regarding the radiographic imaging apparatus 400 may be used as the imaging parameter. For example, information identifying the equipment manufacturer that manufactured the radiographic imaging apparatus 400 or the tube current at the time the perspective image was captured may be used. Also, a combination of the equipment manufacturer, tube voltage, and tube current may be used as the imaging parameter. If the imaging parameter is the combination of one of the tube voltage and the tube current combined with the equipment manufacturer, the imaging parameters closest to the imaging parameters at the time of imaging are imaging parameters in which the equipment manufacturer coincides and in which the tube voltage or tube current value is the closest.

The various functional parts described regarding the above-noted embodiments may be used in combination. For example, the adjuster 144 of the fourth embodiment may be provided in the image processor 100B of the third embodiment.

A program for implementing the image processor in the above-noted embodiments and variations thereof may be recorded in a computer-readable recording medium, a computer system being made to read out and execute the program stored in the recording medium, so as to perform control processing. The term "computer system" used here includes an OS (operating system) and hardware such as peripheral devices. The term "computer-readable recording medium" refers to a removable medium such as a flexible disk, a magnetic optical disk, a ROM (read only memory), a CD-ROM, or the like, or to a storage device such as a hard disk or the like built into a computer system. Additionally, the term "computer-readable recording medium" encompasses one holding a program for a given period of time, such as a volatile memory within a computer system serving as a server or client in the case in which a program is transmitted via a network such as the Internet or via a communication line such as a telephone line.

The above-noted program may be transferred from a computer system in which the program is stored in a storage apparatus to another computer system, either via a transfer medium, or by a transfer wave in a transfer medium. In this case, the term "transfer medium" transferring a program refers to a medium having a function of transferring information, such as a network (communication network) such as the Internet, or a communication circuit (communication line) such as a telephone line. The above-noted program may be for implementing a part of the above-described functionality. Additionally, it may be a so-called difference file (difference program) enabling implementation by combination with a program that already has recorded the above-noted functionality in a computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processor comprising a computer system configured to implement at least:
   an imaging parameter acquirer that acquires an imaging parameter which is used by a radiographic imaging apparatus in capturing a perspective image of a target; and
   a virtual perspective image generator that determines a method of generating a virtual perspective image from volume data of the target in accordance with the imaging parameter, the virtual perspective image generator generating the virtual perspective image from the volume data of the target in accordance with the imaging parameter,
   wherein the virtual perspective image generator determines a weighting coefficient for each voxel value of the volume data based on the imaging parameter, and the virtual perspective image generator generates the virtual perspective image from the volume data by using the weighting coefficients.

2. The image processor according to claim 1, wherein the imaging parameter includes at least one of information indicating a manufacturer of the radiographic imaging apparatus, a tube current applied in the radiographic imaging apparatus at a time of capturing the perspective image, and a tube voltage applied in the radiographic imaging apparatus at a time of capturing the perspective image.

3. The image processor according to claim 1, wherein the imaging parameter acquirer acquires the imaging parameter from information included in the perspective image.

4. The image processor according to claim 1, further comprising:
   a storage that stores a weighting table in which a weighting coefficient is associated with each voxel value of the volume data, in association with each value that the imaging parameter can take; and
   wherein the computer system is configured to implement a selector that selects one weighting table from a plurality of weighting tables stored in the storage, based on the imaging parameter, and
   wherein the virtual perspective image generator generates the virtual perspective image based on the weighting table selected by the generator and the volume data of the target.

5. The image processor according to claim 4, wherein if there is no weighting table corresponding to the value of the imaging parameter in the weighting tables stored in the storage, the selector selects a predetermined number of weighting tables in order of closeness of the value associated with the weighting table to the value of the imaging parameter, calculates a new weighting table based on the selected weighting tables, and selects the calculated weighting table.

6. The image processor according to claim 5, wherein the selector stores the calculated weighting table in the storage.

7. The image processor according to claim 4, wherein the computer system is configured to implement:
   an error evaluator that calculates an error between the virtual perspective image generated by the virtual perspective image generator and the perspective image, the error evaluator judging whether or not the calculated error is no greater than a predetermined threshold, the error evaluator sending instructions to the selector to select a different weighting table anew from the weighting table as selected if the error is larger than the threshold.

8. The image processor according to claim 7, wherein when the selector acquires the instruction from the error evaluator to select the different weighting table, the selector selects the different weighting table corresponding to a different imaging parameter that is closest to the imaging parameter associated with the weighting table that remains selected, and
   the virtual perspective image generator generates a virtual perspective image based on the different weighting table selected anew by the selector and the volume data of the target.

9. The image processor according to claim 4, wherein the selector selects plural ones of the weighting tables stored in the storage, based on the imaging parameter, and
   the virtual perspective image generator generates a virtual perspective image based on the weighting table and the volume data of the target, for each of the selected plurality of weighting tables.

10. The image processor according to claim 9, wherein the computer system is configured to implement:
    an error evaluator that calculates an error between a virtual perspective image and the perspective image for each of the plurality of perspective images generated by the virtual perspective image generator and outputs a virtual perspective image corresponding to the smallest error.

11. The image processor according to claim 4, wherein the computer system is configured to implement:
    an adjuster that presents to a user the weighting table selected by the selector, the adjuster acquiring change information indicating a change of the weighting coefficient with respect to the voxel value, the adjuster changing the weighting coefficient in the weighting table selected by the selector based on the change information, and wherein the virtual perspective image generator generates a virtual perspective image based on the weighting table changed by the adjuster and the volume data of the target.

12. The image processor according to claim 11, wherein the adjuster presents to the user a graph indicating a relationship between each voxel value and the weighting coefficient, and acquires a change of the shape of the graph as the change information.

13. The image processor according to claim 11, wherein the adjuster presents to the user a combination of a predetermined number of voxel values and weighting coefficients in the weighting table, acquires a change of the weighting coefficient in the combination as change information, interpolates one or more weighting coefficients other than the weighting coefficient for a voxel value not included in the combination based on the change information, and changes the weighting coefficients in the weighting table based on the weighting coefficient of the acquired change information and the one or more weighting coefficients obtained by the interpolation.

14. A treatment system comprising:

a radiographic imaging apparatus configured to capture a perspective image of a target;

an image processor comprising a computer system configured to implement at least an imaging parameter acquirer and a virtual perspective image generator, the imaging parameter acquirer acquiring an imaging parameter which is used by the radiographic imaging apparatus in capturing a perspective image of a target, the virtual perspective image generator determining a method of generating a virtual perspective image from volume data acquired by capturing the target in accordance with the imaging parameter, the virtual perspective image generator generating the virtual perspective image from the volume data of the target in accordance with the imaging parameter; and a control apparatus configured to display the perspective image and the virtual perspective image, wherein the virtual perspective image generator determines a weighting coefficient for each voxel value of the volume data based on the imaging parameter, and the virtual perspective image generator generates the virtual perspective image from the volume data by using the weighting coefficients.

15. The treatment system according to claim 14, further comprising:

a movable bed on which the target is rested; and a treatment apparatus that applies radiotherapy to the target, wherein the control apparatus, based on information input by a user comparing the virtual perspective image and the perspective image, controls the movable bed so that a predetermined location of the target is subjected to radiotherapy.

16. The treatment system according to claim 14, wherein the image processor is configured to determine a weighting coefficient for each voxel value of the volume data based on the imaging parameter, and the control apparatus is configured to display a graph indicating a relationship between each voxel value and the weighting coefficient.

17. The treatment system according to claim 16, wherein the control apparatus is configured to display names of internal tissue of the target in proximity to corresponding voxel values in the graph.

18. An image processing method comprising:

acquiring, by an imaging parameter acquirer implemented by a computer system, an imaging parameter which is used when a radiographic imaging apparatus captures a perspective image of a target;

determining, by a virtual perspective image generator implemented by a computer system, a method of generating a virtual perspective image from volume data acquired by capturing the target in accordance with the imaging parameter; and generating, by the virtual perspective image generator, the virtual perspective image from the volume data of the target in accordance with the imaging parameter;

determining, by the virtual perspective image generator, a weighting coefficient for each voxel value of the volume data based on the imaging parameter; and generating, by the virtual perspective image generator, the virtual perspective image from the volume data by using the weighting coefficients.

19. The image processor according to claim 1, wherein the computer system is configured to execute a program stored in a non-transitory computer-readable medium for implementing at least the image parameter acquirer and the virtual perspective image generator.

20. A treatment system comprising:

a radiographic imaging apparatus configured to capture a perspective image of a target;

an image processor comprising a computer system configured to execute a program stored in a non-transitory computer-readable medium to implement at least an imaging parameter acquirer and a virtual perspective image generator, the imaging parameter acquirer acquiring an imaging parameter which is used by the radiographic imaging apparatus in capturing a perspective image of a target, the virtual perspective image generator determining a method of generating a virtual perspective image from volume data acquired by capturing the target in accordance with the imaging parameter, the virtual perspective image generator generating the virtual perspective image from the volume data in accordance with the determined method; and a control apparatus configured to display the perspective image and the virtual perspective image, wherein the imaging parameter includes at least one of information indicating a manufacturer of the radiographic imaging apparatus, a tube current applied in the radiographic imaging apparatus at a time of capturing the perspective image, and a tube voltage applied in the radiographic imaging apparatus at a time of capturing the perspective image wherein when the imaging parameter satisfies a predetermined condition, the virtual perspective image generator generates the virtual perspective image from the volume data of the target based on a weighting table in which a weighting coefficient is associated with each voxel value of the volume data, and wherein when the imaging parameter does not satisfy the predetermined condition, the virtual perspective image generator generates a virtual perspective image from the volume data of the target either based on a weighting coefficient set by a user or without using a weighting coefficient.

* * * * *